US006304600B1

United States Patent
Chiba (10) Patent No.: US 6,304,600 B1
(45) Date of Patent: Oct. 16, 2001

(54) MODULATION/DEMODULATION METHOD AND APPARATUS

(75) Inventor: Katsuharu Chiba, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/120,120

(22) Filed: Jul. 22, 1998

(30) Foreign Application Priority Data

Jul. 22, 1997 (JP) .................................................. 9-196182

(51) Int. Cl.$^7$ ................................ H03K 7/04; H03K 7/06
(52) U.S. Cl. .......................................... 375/239; 375/238
(58) Field of Search ................................. 375/239, 222, 375/242, 238; 329/313; 332/112; 359/182, 172

(56) References Cited

U.S. PATENT DOCUMENTS

| 5,610,947 | * | 3/1997 | Balasubramanian et al. | 375/282 |
| 5,640,160 | * | 6/1997 | Miwa | 341/53 |
| 5,684,871 | * | 11/1997 | Devon et al. | 375/239 |
| 5,691,665 | * | 11/1997 | Ohtani | 329/313 |
| 5,844,942 | * | 12/1998 | Hicks et al. | 375/239 |
| 5,923,701 | * | 7/1999 | Nakamura | 375/200 |

FOREIGN PATENT DOCUMENTS

| 42-3523 | 2/1942 | (JP) . |
| 61-186049 | 8/1986 | (JP) . |
| 63-138838 | 6/1988 | (JP) . |
| 2-2768 | 1/1990 | (JP) . |

OTHER PUBLICATIONS

Tajnai, et al., "Infrared Data Association Serial Infrared Physical Layer Link Specification" Version 1.1 date Oct. 17, 1995, p. 14.

* cited by examiner

Primary Examiner—Chi Pham
Assistant Examiner—Khai Tran
(74) Attorney, Agent, or Firm—McGinn & Gibb, PLLC (57) ABSTRACT

In a modulation/demodulation system for an infrared data communication, a three-bit serial-to-parallel converting circuit captures an input signal in units of three bits in synchronism with an input clock, and outputs a three-bit parallel data to a decoder. This decoder converts the three-bit parallel data into a four-bit parallel data having different patterns corresponding to all different patterns of the three-bit parallel data in a one-to-one relation. In this four-bit parallel data, regardless of how the four-bit parallel data are serially arranged, the total length of the continuing "1" bits is two bits at maximum, and the total length of the continuing "0" bits is six bits at maximum. A four-bit parallel-to-serial converting circuit receives the four-bit parallel data, to serially output a serial data in synchronism with a modulation clock. Thus, the data transfer rate can be elevated in the infrared data communication.

18 Claims, 8 Drawing Sheets

| INPUT SIGNAL | | | MODULATION SIGNAL | | | |
|---|---|---|---|---|---|---|
| | | | a | b | c | d |
| 0 | 0 | 0 | 1 | 0 | 0 | 0 |
| 0 | 0 | 1 | 0 | 1 | 0 | 0 |
| 0 | 1 | 0 | 0 | 0 | 1 | 0 |
| 0 | 1 | 1 | 0 | 0 | 0 | 1 |
| 1 | 0 | 0 | 1 | 0 | 0 | 1 |
| 1 | 0 | 1 | 0 | 1 | 1 | 0 |
| 1 | 1 | 0 | 1 | 0 | 1 | 0 |
| 1 | 1 | 1 | 0 | 1 | 0 | 1 |

Fig. 1

| INPUT SIGNAL | | | MODULATION SIGNAL | | | |
|---|---|---|---|---|---|---|
| | | | a | b | c | d |
| 0 | 0 | 0 | 1 | 0 | 0 | 0 |
| 0 | 0 | 1 | 0 | 1 | 0 | 0 |
| 0 | 1 | 0 | 0 | 0 | 1 | 0 |
| 0 | 1 | 1 | 0 | 0 | 0 | 1 |
| 1 | 0 | 0 | 1 | 0 | 0 | 1 |
| 1 | 0 | 1 | 0 | 1 | 1 | 0 |
| 1 | 1 | 0 | 1 | 0 | 1 | 0 |
| 1 | 1 | 1 | 0 | 1 | 0 | 1 |

| INPUT SIGNAL | | MODULATION SIGNAL | | | |
|---|---|---|---|---|---|
| | | a | b | c | d |
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

MODULATION/DEMODULATION METHOD AND APPARATUS

BACKGROUND OF THE INVENTION

1. Field of the Invention

The present invention relates to a transmitter/receiver capable of infrared-communicating with a personal computer, a portable information terminal and other home use instruments, which has an infrared communication function, and more specifically to a modulation/demodulation method and apparatus for transferring a large amount of data by use of infrared.

2. Description of Related Art

A prior art modulation/demodulation system used in an infrared communication of a personal computer is one called a "4 pulse position modulation" (called a "4PPM" hereinafter). As prescribed in "Infrared Data Association Serial Infrared Physical Layer Link Specification", the 4PPM is that an input signal of two bits is modulated to a modulation signal in which one word consists of four bits. At this time, the modulation signal has a pulse on only one bit within each one word, and the position of the pulse in the word is different from one pattern of an input signal to another.

Figure 9:
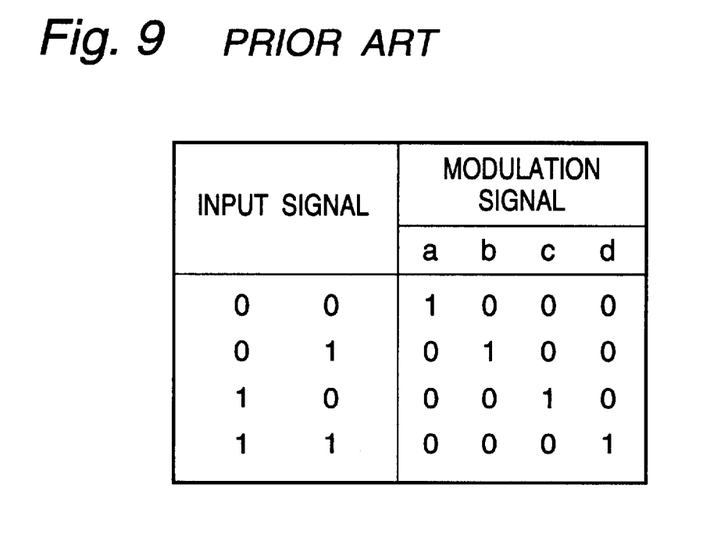
FIG. 9 is a diagram illustrating a correspondence between the input signal and the modulation signal in the prior art 4PPM system.

Referring to FIG. 9, there is shown a diagram illustrating a correspondence between the input signal and the modulation signal in the 4PPM system. In the modulation signal, a first bit is called "a", and a second bit is called "b". A third bit is called "c" and a fourth bit is called "d". When the two bits of the input signal is constituted of "00", the pulse exists on the first bit "a" in the corresponding modulation signal. When the two bits of the input signal is constituted of "01", "10" or "11", the pulse exists on the second bit "b", the third bit "c" or the fourth bit "d" in the corresponding modulation signal.

Figure 10:
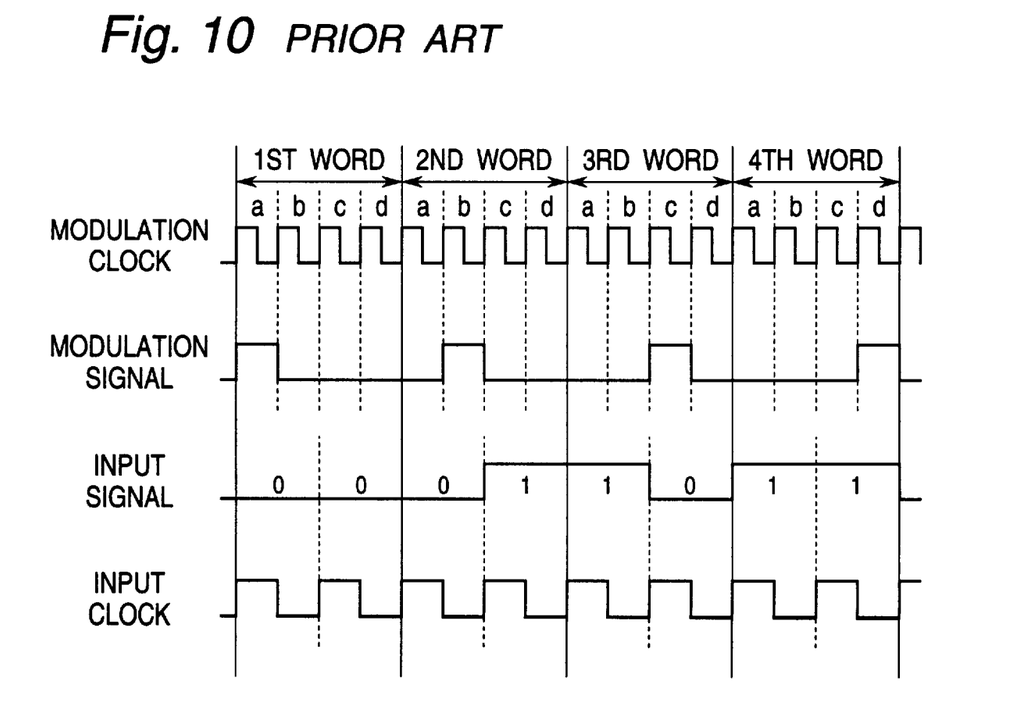
FIG. 10 is a first timing chart illustrating the input signal and the modulation signal in the prior art 4PPM system.

Referring to FIG. 10, there is shown a first timing chart illustrating the input signal and the modulation signal in the 4PPM system. In FIG. 10, the modulation signal is in synchronism with the rising of a modulation clock, and the modulation signal is constituted of four bits (namely, one word) with four modulation clocks. On the other hand, the input signal is in synchronism with the rising of an input clock, and the input signal is constituted of two bits (namely, one word) with two input clocks. Accordingly, the frequency of the input clock is a half the frequency of the modulation clock. For example, if the input clock is 4 MHz, the modulation clock becomes 8 MHz. In this case, the transfer rate is 4 Mbps (Mega bit per second).

In FIG. 10, similarly to FIG. 9, a first bit, a second bit, a third bit and a fourth bit in one word of the modulation signal are called "a", "b", "c" and "d", respectively. The first word corresponds to the input signal "00" and the modulation signal has the pulse positioned on the first bit "a". The second word corresponds to the input signal "01" and the modulation signal has the pulse positioned on the second bit "b". The third word corresponds to the input signal "10" and the modulation signal has the pulse positioned on the third bit "b". The fourth word corresponds to the input signal "11" and the modulation signal has the pulse positioned on the fourth bit "d".

Figure 11:
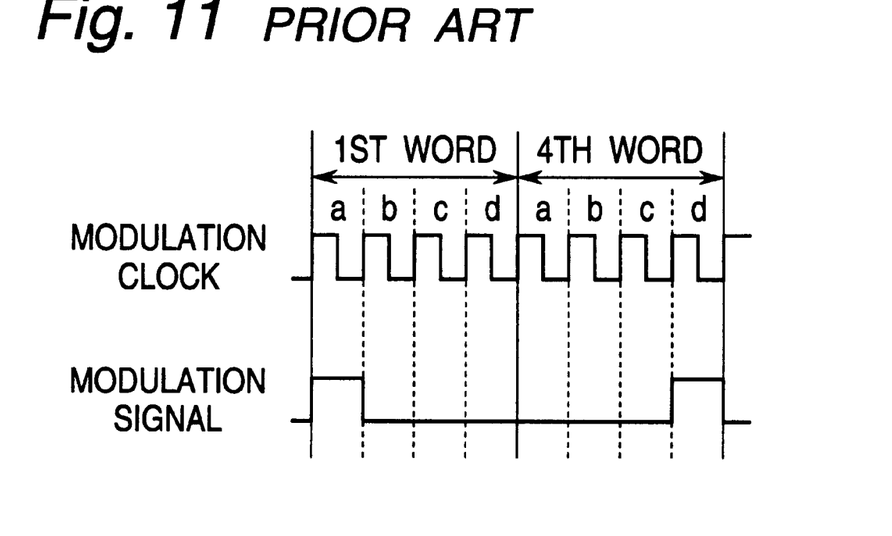
FIG. 11 is a second timing chart illustrating the input signal and the modulation signal in the prior art 4PPM system.

Referring to FIG. 11, there is shown a second timing chart illustrating the input signal and the modulation signal in the 4PPM system. FIG. 11 illustrates the waveform of the modulation signal in a situation in which the fourth word shown in FIG. 10 follows the first word shown in FIG. 10. In FIG. 11, the modulation signal has the pulse positioned at the bit "a" in the first word and the pulse positioned at the bit "d" in the fourth word. In this case, six bits having no pulse continues from the bit "b" of the first word to the bit "c" of the fourth word. In the 4PPM, the bit width of continuing bits having no pulse is 6 bits as shown in FIG. 11.

Figure 12:
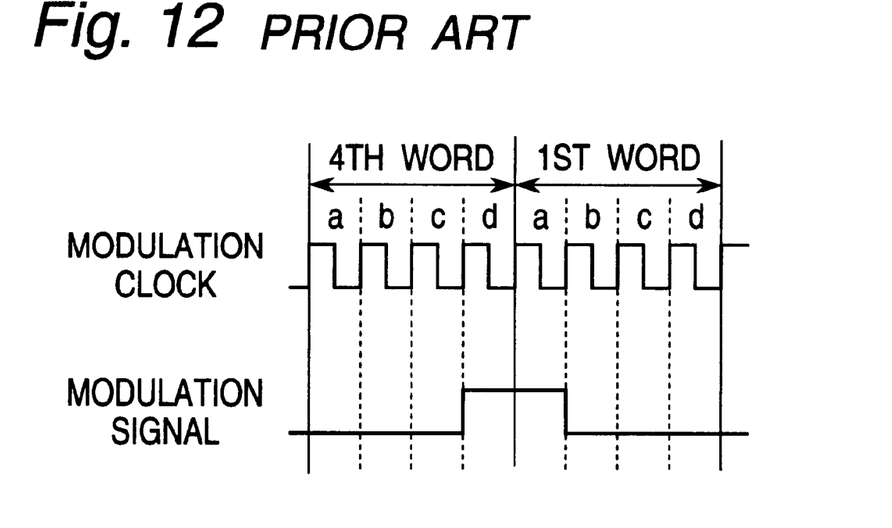
FIG. 12 is a third timing chart illustrating the input signal and the modulation signal in the prior art 4PPM system.

Referring to FIG. 12, there is shown a third timing chart illustrating the input signal and the modulation signal in the 4PPM system. FIG. 12 illustrates the waveform of the modulation signal in a situation in which the first word shown in FIG. 10 follows the fourth word shown in FIG. 10. In FIG. 12, the modulation signal has the pulse positioned at the bit "d" in the fourth word and the pulse positioned at the bit "a" in the first word. In this case, only two bits having the pulse continues at maximum. In the 4PPM, the bit width of continuing bits having the pulse is 2 bits as shown in FIG. 11.

In the infrared communication, the pulse width of the modulation signal is influenced with a response characteristics of an infrared light emitting diode. In other words, the pulse width of the modulation signal emitted from the infrared light emitting diode and therefore influenced by the response characteristics of the infrared light emitting diode becomes wide or narrow in comparison with an inherent pulse width of the modulation signal.

If many bits of the pulse continue, or if many bits of no pulse continue, the modulation signal influenced by the response characteristics of the infrared light emitting diode is not synchronized with the modulation clock, with the result that a normal communication cannot be obtained. In the 4PPM, as mentioned above, the continuing bits of the pulse are two bits at maximum, and the continuing bits of no pulse are six bits at maximum. Therefore, they are relatively small. On the other hand, if the frequency of the modulation clock increases, the inherent pulse width of the modulation signal becomes narrow, with the result that the response of the infrared light emitting diode cannot follow the change of the modulation signal, and therefore, a normal communication cannot be obtained. Because of these reasons, the prior art infrared communication adopts the modulation system of the 4PPM, the modulation clock frequency of 8 MHz, and the transfer rate of 4 Mbps.

Figure 13:
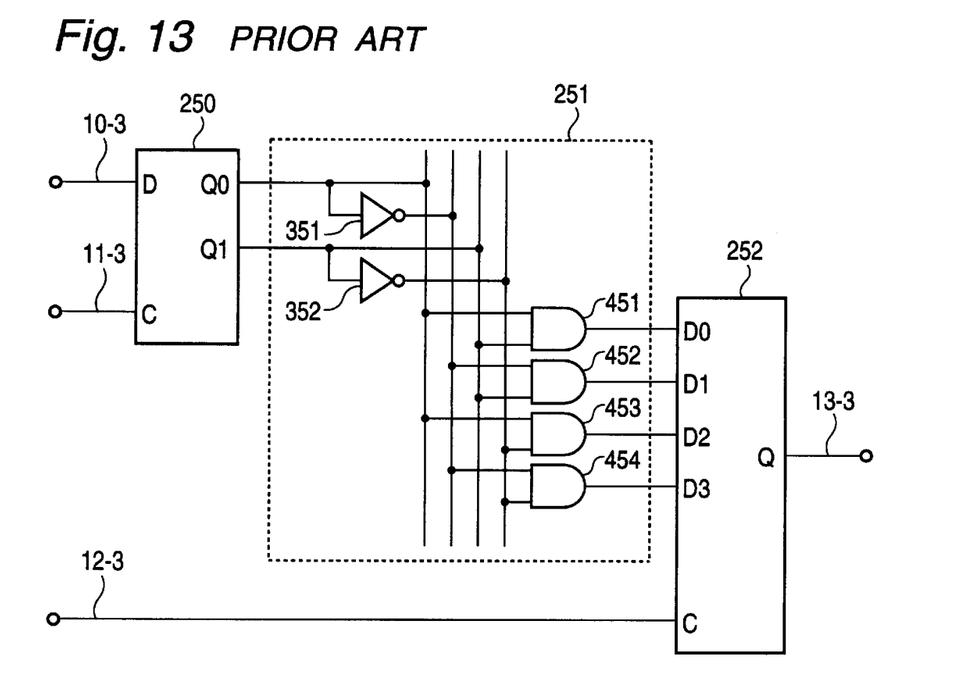
FIG. 13 is a circuit diagram illustrating one example of a modulation circuit at a transmitter side in the prior art 4PPM system.

Incidentally, referring to FIG. 13, there is shown a circuit diagram illustrating one example of a modulation circuit at a transmitter side in the 4PPM system. In FIG. 13, Reference Numeral 250 designates a two-bit serial-to-parallel conversion circuit, and Reference Numeral 251 denotes a decoder. Reference Numeral 252 indicates a four-bit parallel-to-serial conversion circuit. Reference Numeral 10-3 shows an input signal supplied to a data input of the two-bit serial-to-parallel conversion circuit 250, and Reference Numeral 11-3 designates an input clock supplied to a clock input of the two-bit serial-to-parallel conversion circuit 250. Reference Numeral 12-3 denotes a modulation clock supplied to a clock input of the four-bit parallel-to-serial conversion circuit 252, and Reference Numeral 13-3 indicates a modulation signal outputted from a data output of the four-bit parallel-to-serial conversion circuit 252.

The above mentioned decoder 251 comprises inverters 351 and 352 and AND gates 451, 452, 453 and 454, which are connected as shown. An input of the inverter 351 is connected to a first output of the two-bit serial-to-parallel conversion circuit 250, and an input of the inverter 352 is connected to a second output of the two-bit serial-to-parallel conversion circuit 250. The AND gate 451 has inputs connected to the first output and the second output of the two-bit serial-to-parallel conversion circuit 250, respectively. The AND gate 452 has inputs connected to an output of the inverter 351 and the second output of the two-bit serial-to-parallel conversion circuit 250, respectively. The AND gate 453 has inputs connected to the first output of the two-bit serial-to-parallel conversion circuit 250 and an output of the inverter 352, respectively. The AND gate 454 has inputs connected to the output of the inverter 351 and the output of the inverter 352, respectively. The four-bit parallel-to-serial conversion circuit 252 has first, second, third and fourth data inputs connected to an output of the AND gates 451, 452, 453 and 454, respectively.

In the above mentioned construction, when the two-bit serial-to-parallel conversion circuit 250 captures the two-bit serial data "00" as the input signal 10-3 in synchronism with the input clock 11-3, the two-bit serial-to-parallel conversion circuit 250 outputs "0" from the first output and "0" from the second output. In the decoder 251 receiving the outputs of the two-bit serial-to-parallel conversion circuit 250, the AND gate 451 outputs "0", the AND gate 452 outputs "0", the AND gate 453 outputs "0", and the AND gate 454 outputs "1".

The four-bit parallel-to-serial conversion circuit 252 captures the outputs of the AND gates 451, 452, 453 and 454 at their first, second, third and fourth data inputs, respectively, in parallel. In synchronism with the modulation clock 12-3, the four-bit parallel-to-serial conversion circuit 252 serially outputs the fourth data input, the third data input, the second data input and the first data input in the named order as the modulation signal 13-3. Namely, the four-bit serial data "1000" is outputted as the modulation signal 13-3. This operation shows the modulation of the first word shown in FIG. 10.

Similarly, when the two-bit serial-to-parallel conversion circuit 250 captures the two-bit serial data "01" as the input signal 10-3, the AND gate 451 outputs "0", the AND gate 452 outputs "0", the AND gate 453 outputs "1", and the AND gate 454 outputs "0". Namely, the four-bit serial data "0100" is outputted as the modulation signal 13-3. This operation shows the modulation of the second word shown in FIG. 10.

Similarly, when the two-bit serial-to-parallel conversion circuit 250 captures the two-bit serial data "10" as the input signal 10-3, the AND gate 451 outputs "0", the AND gate 452 outputs "1", the AND gate 453 outputs "0", and the AND gate 454 outputs "0". Namely, the four-bit serial data "0010" is outputted as the modulation signal 13-3. This operation shows the modulation of the third word shown in FIG. 10.

Similarly, when the two-bit serial-to-parallel conversion circuit 250 captures the two-bit serial data "11" as the input signal 10-3, the AND gate 451 outputs "1", the AND gate 452 outputs "0", the AND gate 453 outputs "0", and the AND gate 454 outputs "0". Namely, the four-bit serial data "0001" is outputted as the modulation signal 13-3. This operation shows the modulation of the fourth word shown in FIG. 10.

Figure 14:
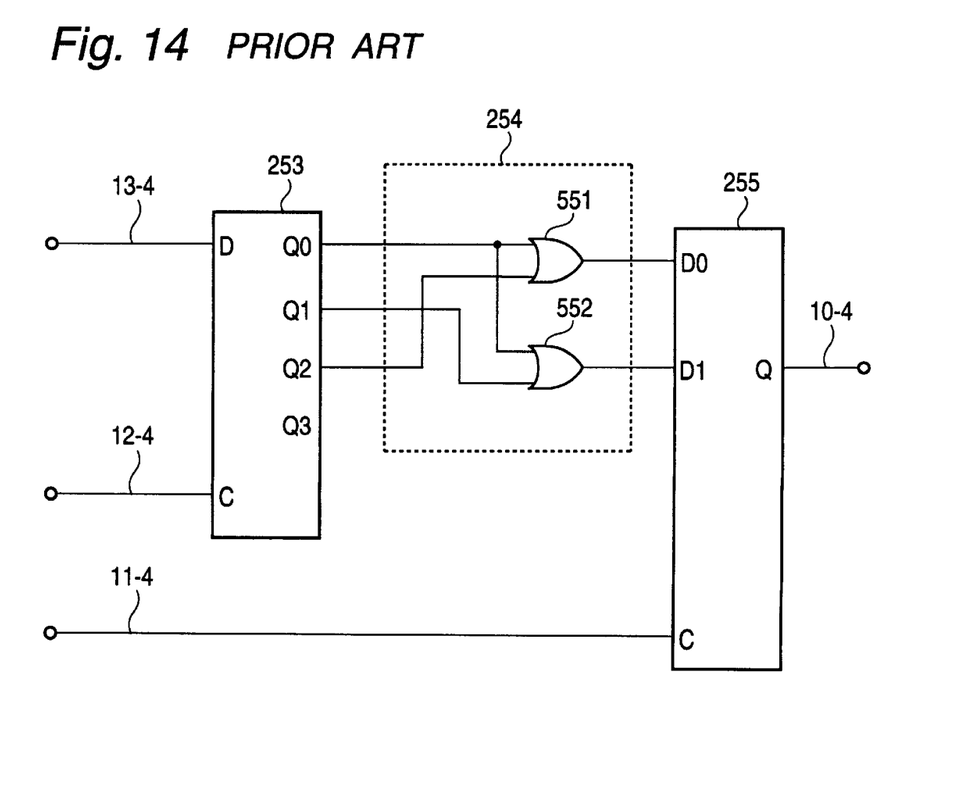
FIG. 14 is a circuit diagram illustrating one example of a demodulation circuit at a receiver side in the prior art 4PPM system.

Referring to FIG. 14, there is shown a circuit diagram illustrating one example of a demodulation circuit at a receiver side in the 4PPM system. In FIG. 14, Reference Numeral 253 designates a four-bit serial-to-parallel conversion circuit, and Reference Numeral 254 denotes a encoder. Reference Numeral 255 indicates a two-bit parallel-to-serial conversion circuit. Reference Numeral 13-4 shows a modulation signal supplied to a data input of the four-bit serial-to-parallel conversion circuit 253, and Reference Numeral 124 designates a modulation clock supplied to a clock input of the four-bit serial-to-parallel conversion circuit 253. Reference Numeral 11-4 denotes an input clock supplied to a clock input of the two-bit parallel-to-serial conversion circuit 255, and Reference Numeral 104 indicates an output signal outputted from a data output of the two-bit parallel-to-serial conversion circuit 255.

The encoder 252 includes two OR gates 551 and 552 connected as shown. The OR gate 551 has two inputs connected to a first output and a third output of the four-bit serial-to-parallel conversion circuit 253, respectively. The OR gate 552 has two inputs connected to the first output and a second output of the four-bit serial-to-parallel conversion circuit 253, respectively. An output of the OR gates 551 and 552 are connected to a first data input and a second data input of the two-bit parallel-to-serial conversion circuit 255, respectively.

With the above mentioned arrangement, when the four-bit serial-to-parallel conversion circuit 253 captures the four-bit serial data "1000" as the modulation signal 13-4 in synchronism with the modulation clock 12-4, the four-bit serial-to-parallel conversion circuit 253 outputs "0", "0", "0" and "1" from the first output, the second output, the third output and the fourth output, respectively. In the encoder 254 receiving the outputs of the four-bit serial-to-parallel conversion circuit 253, the OR gate 551 outputs "0" and the OR gate 552 outputs "0". The two-bit parallel-to-serial conversion circuit 255 receives the output of the OR gate 551 at its first data input and the output of the OR gate 552 at its second data input, and serially outputs the second data input and the first data input in the named order in synchronism with the input clock 11-4. In other words, the two-bit serial data "00" is outputted as the output signal 10-4. This operation shows the demodulation of the first word shown in FIG. 10.

Similarly, when the four-bit serial-to-parallel conversion circuit 253 captures the four-bit serial data "0100" as the modulation signal 13-4, the OR gate 551 outputs "1" and the OR gate 552 outputs "0". Namely, the two-bit serial data "01" is outputted as the output signal 10-4. This operation shows the demodulation of the second word shown in FIG. 10.

Similarly, when the four-bit serial-to-parallel conversion circuit 253 captures the four-bit serial data "0010" as the modulation signal 13-4, the OR gate 551 outputs "0" and the OR gate 552 outputs "1". Namely, the two-bit serial data "10" is outputted as the output signal 10-4. This operation shows the demodulation of the third word shown in FIG. 10.

Similarly, when the four-bit serial-to-parallel conversion circuit 253 captures the four-bit serial data "0001" as the modulation signal 134, the OR gate 551 outputs "1" and the OR gate 552 outputs "1". Namely, the two-bit serial data "11" is outputted as the output signal 10-4. This operation shows the demodulation of the fourth word shown in FIG. 10.

In the 4PPM system, the data transfer rate is determined by the frequency of the input clock. The prior art 4PPM system has the input clock frequency of 4 MHz, the modulation clock frequency of 8 MHz and the data transfer rate of 4 Mbps . In this case, the frequency of the input clock is a half the frequency of the modulation clock. In the prior art 4PPM system, therefore, since data is transmitted after the two-bit input signal is modulated to the four-bit modulation signal, the data transfer rate is low.

Furthermore, when the infrared communication is performed in the 4PPM system, if it is attempted to increase the frequency of the modulation clock in order to elevate the data transfer rate, the response characteristics of the infrared light emitting diode becomes unable to follow the change of the modulation signal. Therefore, it is impossible to increase the frequency of the modulation clock.

SUMMARY OF THE INVENTION

Accordingly, it is an object of the present invention to provide modulation/demodulation method and apparatus which have overcome the above mentioned problems of the prior art.

Another object of the present invention is to provide modulation/demodulation method and apparatus having an increased data transfer rate.

The above and other objects of the present invention are achieved in accordance with the present invention by a modulation/demodulation method so configured that at a transmitter side, data is transmitted after an input signal is converted into a modulation signal train composed of serially arranged words each constituted of bits of a predetermined number larger than the bit number of the input signal, and the position of a pulse existing in the word is different from one pattern of the input signal to another, wherein at the transmitter side, the input signal is divided into signal strings each consisting of "n" bits, where "n" is a positive integer larger than "1", and each signal string consisting of "n" bits is converted into a modulation signal string of one word consisting of "n+1" bits, and then, the modulation signal string is serially transmitted bit by bit, and wherein at the receiver side, the signal serially received bit by bit is divided into received signal strings each consisting of "n+1" bits, and each of the received signal strings is demodulated into a demodulated signal string consisting of "n" bits, so that the demodulated signal string is serially outputted bit by bit.

In a specific embodiment, "n" is 3 and therefore "n+1" is 4, and the modulation signal string includes eight different patterns of "1000", "0100", "0010", "0001", "1001", "0110", "1010" and "0101".

According to another aspect of the present invention, there is provided a modulation/demodulation apparatus so configured that at a transmitter side, data is transmitted after an input signal is converted into a modulation signal train composed of serially arranged words each constituted of bits of a predetermined number larger than the bit number of the input signal, and the position of a pulse existing in the word is different from one pattern of the input signal to another, wherein the transmitter side includes a first converting means for converting the input signal into signal strings each consisting of "n" bits, where "n" is a positive integer larger than "1", a modulating means for modulating each signal string consisting of "n" bits into a modulation signal string of one word consisting of "n+1" bits, and a first output means for serially outputting the modulation signal string bit by bit.

In an embodiment, a receiver side includes a second converting means for converting the signal serially outputted bit by bit from the first output means of the transmitter side, into received signal strings each consisting of "n+1" bits, a demodulating means for demodulating each received signal string into a demodulated signal string consisting of "n" bits, and a second output means for serially outputting bit by bit the demodulated signal string consisting of "n" bits.

Specifically, the modulation means converts a binary signal string of the "n" bits having a $2^n$ different combinations, into the modulation signal string of one word consisting of the "n+1" bits having $2^n$ different combination patterns corresponding to the $2^N$ different combinations in a one-to-one relation. In each of the $2^n$ different modulation signal strings, regardless of how the modulation signal strings are serially arranged, the signal value of "1" continues only two signals at maximum, and the signal value of "0" continues only six signals at maximum.

In a specific embodiment, "n" is 3 and therefore "n+1" is 4, and the modulation signal string includes eight different patterns of "1000", "0100", "0010", "0001", "0110", "1010" and "0101".

As seen from the above, in the present invention, if the input signal is modulated and transmitted with "n"=3 and "n+1"=4, information of three data bits to be transferred is included in each four bits of the modulation signal. Thus, since the information amount becomes one and half times of the prior art, the data transfer rate can be elevated to one and half times.

The above and other objects, features and advantages of the present invention will be apparent from the following description of preferred embodiments of the invention with reference to the accompanying drawings.

DESCRIPTION OF THE PREFERRED EMBODIMENTS

Now, embodiments of the present invention will be described with reference to the accompanying drawings.

Signal Construction

Figure 1:
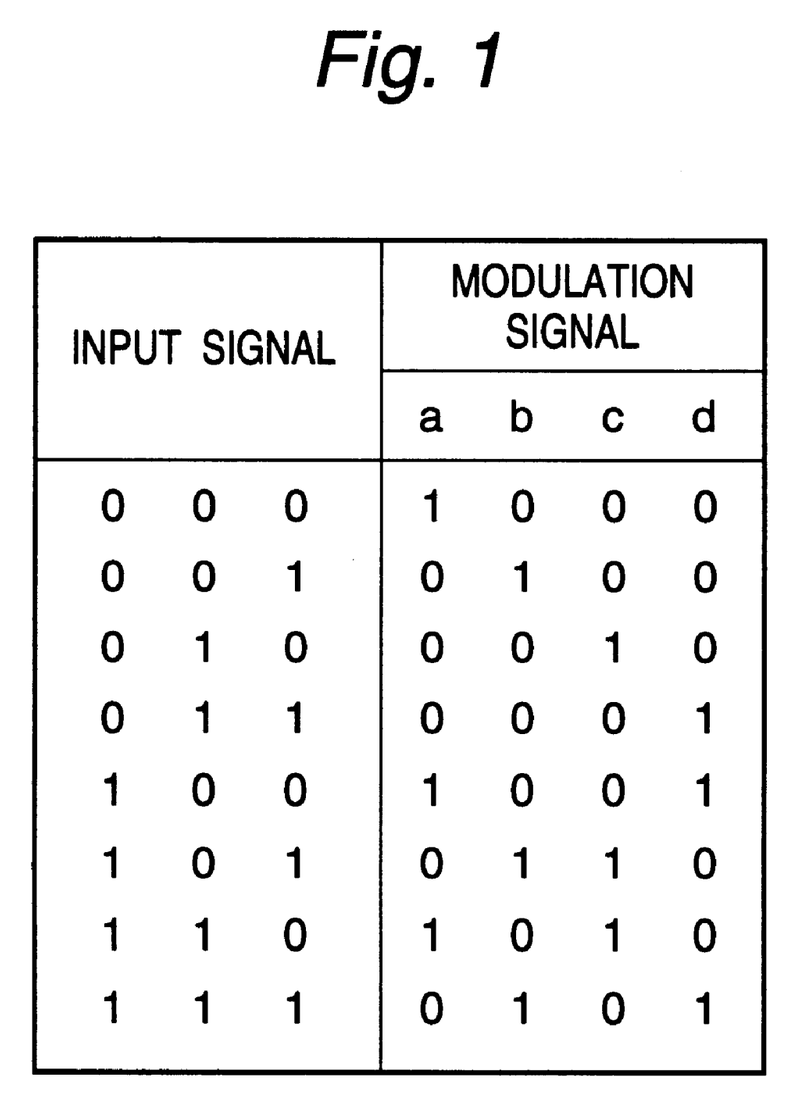
FIG. 1 is a diagram illustrating a correspondence between the input signal and the modulation signal in one embodiment of the modulation/demodulation system in accordance with the present invention.

Referring to FIG. 1, there is shown a diagram illustrating a correspondence between the input signal and the modulation signal in one embodiment of the modulation/demodulation system in accordance with the present invention.

As shown in FIG. 1, in the modulation signal, a first bit is called "a", and a second bit is called "b". A third bit is called "c" and a fourth bit is called "d". When three bits of an input signal is constituted of "000", the pulse exists on only the first bit "a" in the modulation signal. When the three bits of the input signal is constituted of "001", the pulse exists on only the second bit "b" in the modulation signal. When the three bits of the input signal is constituted of "010" or "011", the pulse exists on only the third bit "c" or the fourth bit "d" in the modulation signal, respectively.

Furthermore, when the three bits of the input signal is constituted of "100", the pulse exists on the first bit "a" and the fourth bit "d" in the modulation signal. When the three bits of the input signal is constituted of "101", the pulse exists on the second bit "b" and the third bit "d" in the modulation signal. When the three bits of the input signal is constituted of "110", the pulse exists on the first bit "a" and the third bit "c" in the modulation signal. When the three bits of the input signal is constituted of "111", the pulse exists on the second bit "b" and the fourth bit "d" in the modulation signal.

Figure 2:
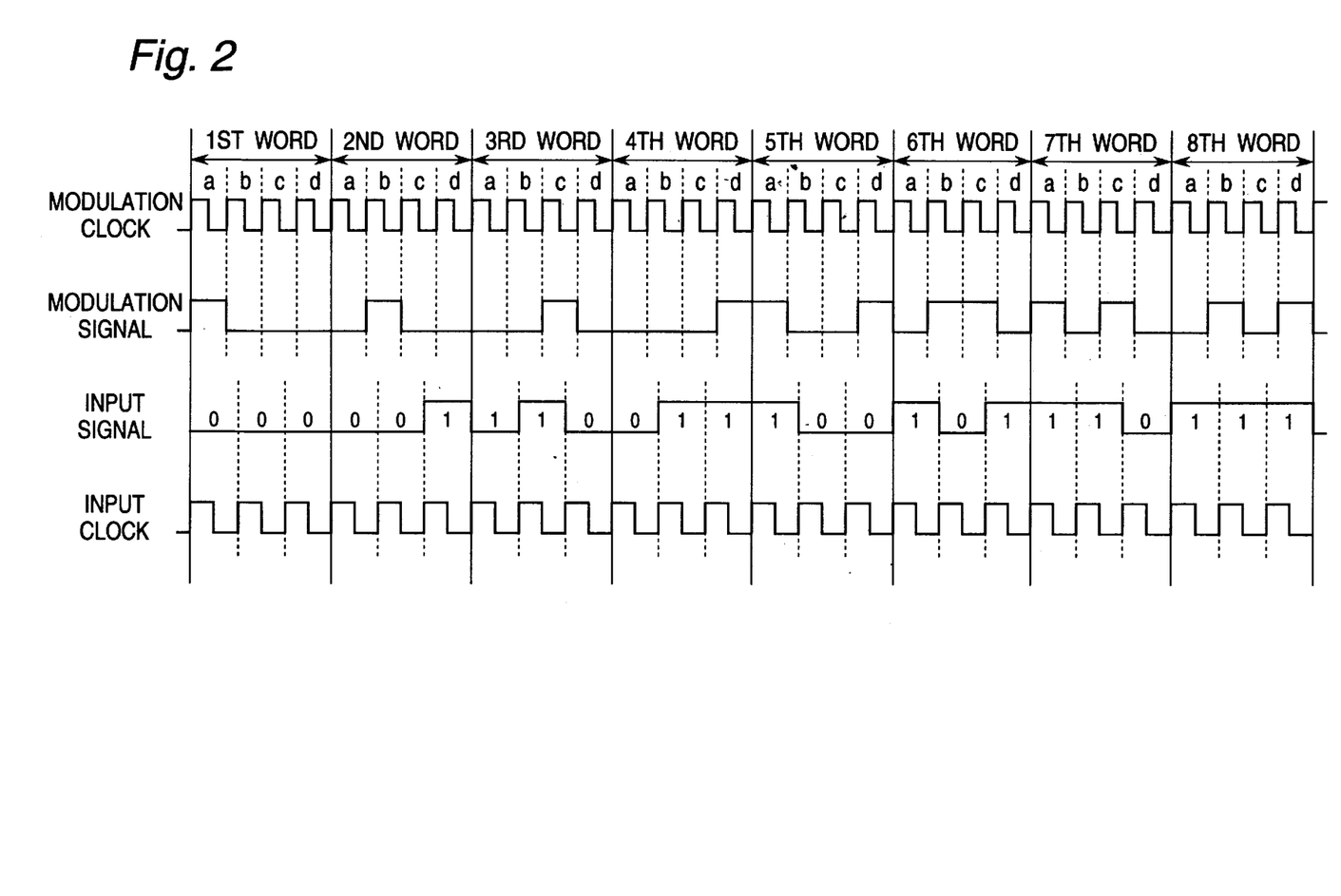
FIG. 2 is a first timing chart illustrating the input signal and the modulation signal in the one embodiment of the modulation/demodulation system in accordance with the present invention.

Referring to FIG. 2, there is shown a first timing chart illustrating the input signal and the modulation signal in the one embodiment of the modulation/demodulation system in accordance with the present invention. In FIG. 2, the modulation signal is in synchronism with the rising of a modulation clock, and the modulation signal of one word consisting of four bits is outputted with four modulation clocks. On the other hand, the input signal is in synchronism with the rising of an input clock, and the input signal of one word consisting of three bits is supplied with three input clocks.

The frequency of the input clock is ¾ of the frequency of the modulation clock. For example, if the input clock frequency is 6 MHz, the modulation clock frequency becomes 8 MHz. In this case, the data transfer rate is 6 Mbps.

Incidentally, in FIG. 2, the construction of the modulation signal of one word is the same as that shown in FIG. 1 and given the same Reference Signs. In the first word, the input signal is "000", and the pulse exists on only the first bit "a" in the modulation signal. In the second word, the input signal is "001", the pulse exists on only the second bit "b" in the modulation signal. In the third word, the input signal is "010", the pulse exists on only the third bit "c" in the modulation signal, respectively. In the fourth word, the input signal is "011", the pulse exists on only the fourth bit "d" in the modulation signal. In the fifth word, the input signal is "100", the pulse exists on the first bit "a" and the fourth bit "d" in the modulation signal. In the sixth word, the input signal is "101", the pulse exists on the second bit "b" and the third bit "c" in the modulation signal. In the seventh word, the input signal is "110", the pulse exists on the first bit "a" and the third bit "c" in the modulation signal. In the eighth word, the input signal is "111", the pulse exists on the second bit "b" and the fourth bit "d" in the modulation signal.

Figure 3:
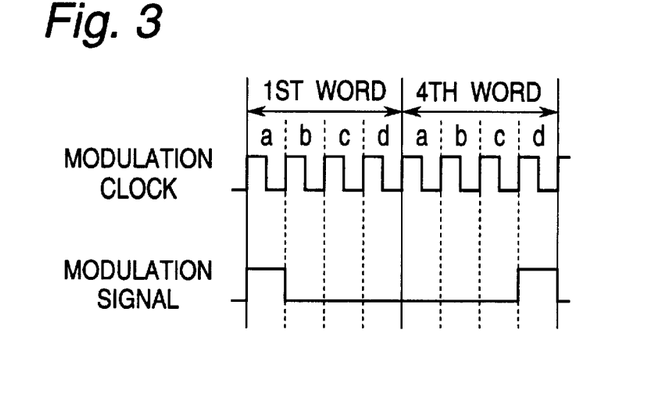
FIG. 3 is a second timing chart illustrating the input signal and the modulation signal in the one embodiment of the modulation/demodulation system in accordance with the present invention.

Referring to FIG. 3, there is shown a second timing chart illustrating the input signal and the modulation signal in the one embodiment of the modulation/demodulation system in accordance with the present invention. FIG. 3 illustrates the waveform of the modulation signal in a situation in which the fourth word shown in FIG. 2 follows the first word shown in FIG. 2. In FIG. 3, the modulation signal has the pulse positioned at the bit "a" in the first word and the pulse positioned at the bit "d" in the fourth word. In this case, six bits having no pulse continues from the bit "b" of the first word to the bit "c" of the fourth word. In the modulation/demodulation system in accordance with the present invention, the bit width of continuing bits having no pulse is 6 bits as shown in FIG. 3. This is the same as the 4PPM system.

Figure 4:
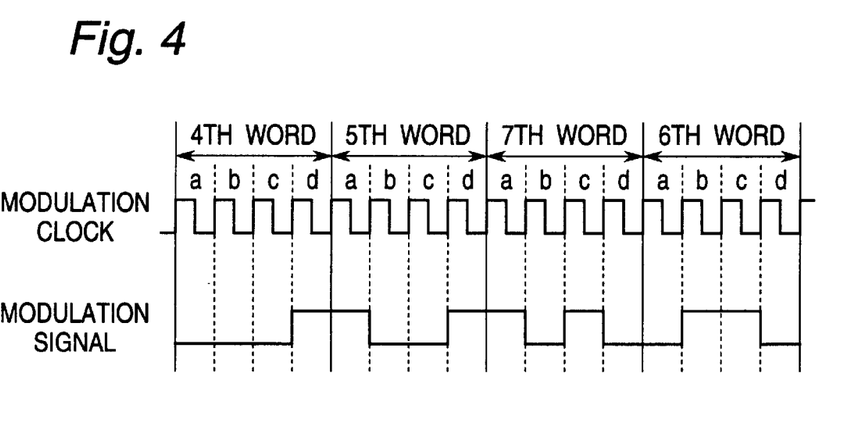
FIG. 4 is a third timing chart illustrating the input signal and the modulation signal in the one embodiment of the modulation/demodulation system in accordance with the present invention.

Referring to FIG. 4, there is shown a third timing chart illustrating the input signal and the modulation signal in the one embodiment of the modulation/demodulation system in accordance with the present invention. FIG. 4 illustrates the waveform of the modulation signal in a situation in which the fourth word, the fifth word, the seventh word and the sixth word shown in FIG. 2 continues in the named order. In FIG. 4, the pulse continues from the bit "d" in the fourth word to the it "a" in the fifth word. In addition, the pulse continues from the bit "d" in the fifth word to the bit "a" in the seventh word. Furthermore, the pulse continues from the bit "b" to the bit "c" in the same sixth word. In the modulation/demodulation system in accordance with the present invention, there are other situations in which the pulse continues over the two continuous bits, but only two bits having the pulse continues at maximum. This is also the same as the 4PPM system.

Modulation Circuit

Figure 5:
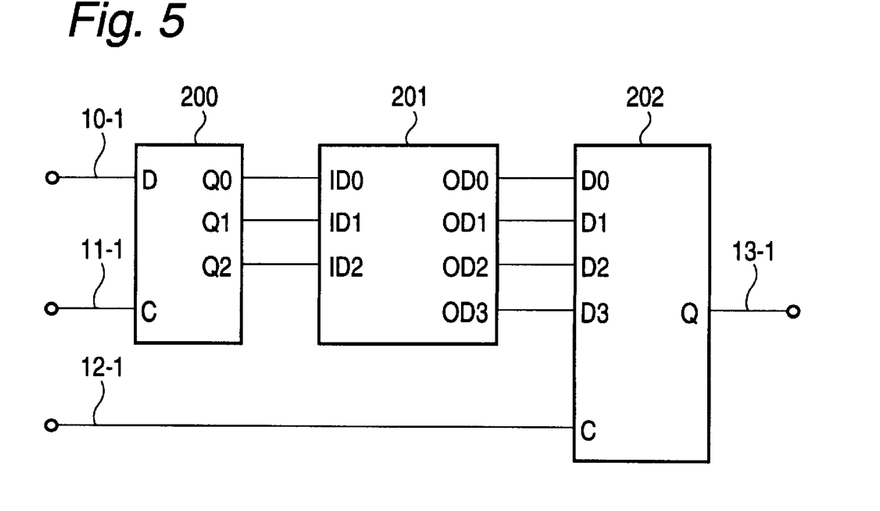
FIG. 5 is a circuit diagram illustrating one example of a modulation circuit at a transmitter side in the one embodiment of the modulation/demodulation system in accordance with the present invention.

Referring to FIG. 5, there is shown a circuit diagram illustrating one example of a modulation circuit at a transmitter side in the one embodiment of the modulation/demodulation system in accordance with the present invention.

In FIG. 5, Reference Numeral 200 designates a three-bit serial-to-parallel conversion circuit, and Reference Numeral 201 denotes a decoder. Reference Numeral 202 indicates a four-bit parallel-to-serial conversion circuit. Reference Numeral 10-1 shows an input signal supplied to a data input D of the three-bit serial-to-parallel conversion circuit 200, and Reference Numeral 11-1 designates an input clock supplied to a clock input C of the three-bit serial-to-parallel conversion circuit 200. Reference Numeral 12-1 denotes a modulation clock supplied to a clock input C of the four-bit parallel-to-serial conversion circuit 202, and Reference Numeral 13-1 indicates a modulation signal outputted from a data output Q of the four-bit parallel-to-serial conversion circuit 202.

First, second and third inputs ID0, ID1 and ID2 of the decoder 201 are connected to first, second and third data outputs Q0, Q1 and Q2 of the three-bit serial-to-parallel conversion circuit 200, respectively. First, second, third and fourth outputs OD0, OD1, OD2 and OD3 of the decoder 201 are connected to first, second, third and fourth data inputs D0, D1, D2 and D3 of the four-bit parallel-to-serial conversion circuit 202.

Figure 6:
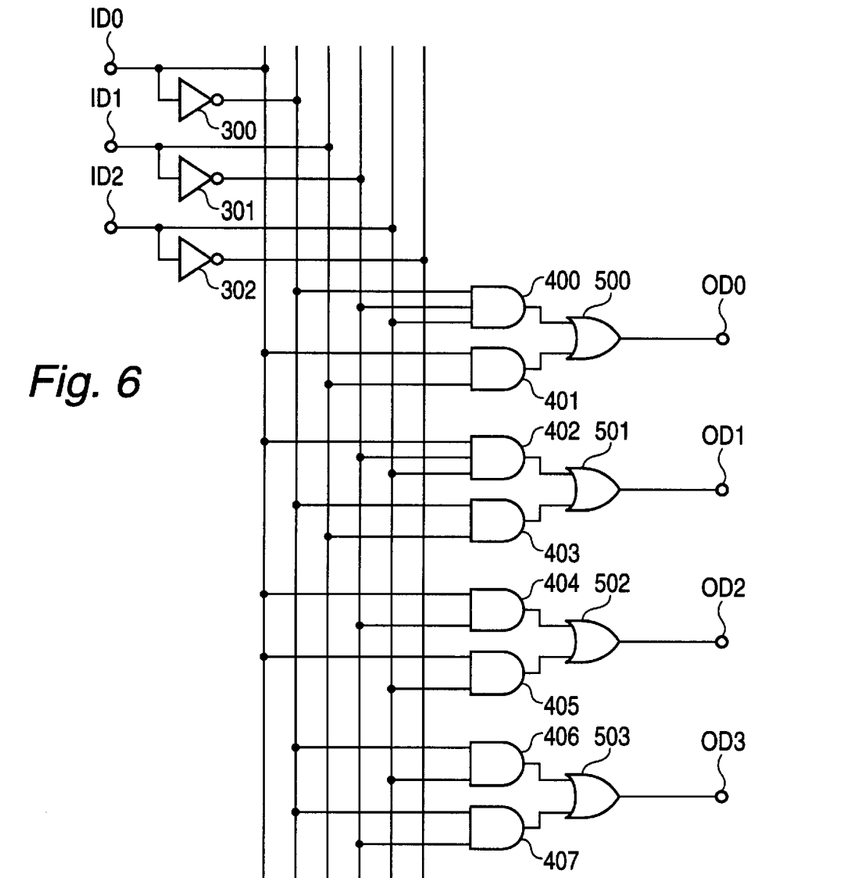
FIG. 6 is a circuit diagram illustrating one example of the decoder included in the modulation circuit shown in FIG. 5.

FIG. 6 is a circuit diagram illustrating one example of the decoder 201 included in the modulation circuit shown in FIG. 5. The decoder 201 includes the first input ED0, the second input ID1, the third input ID2, the first output OD0, the second output OD1, the third output OD2, the fourth OD3, inverters 300, 301 and 302, AND gates 400, 401, 402, 403, 404, 405, 406 and 407, and OR gates 500, 501, 502 and 503, which are connected as shown.

An input of the inverter 300 is connected to the first input ID0, and an input of the inverter 301 is connected to the second input ID1. An input of the inverter 302 is connected to the third input ID2. Inputs of the AND gate 400 are connected to an output of the inverter 300, an output of the inverter 301 and the third input 1D2, respectively. Inputs of the AND gate 401 are connected to the first input ID0 and the second input ID1, respectively Inputs of the AND gate 402 are connected to the first input ID0, the output of the inverter 301 and the third input ID2, respectively. Inputs of the AND gate 403 are connected to the output of the inverter 300 and the second input ID1, respectively. Inputs of the AND gate 404 are connected to the first input ID0 and the output of the inverter 301, respectively. Inputs of the AND gate 405 are connected to the first input ID0 and the third input ID2, respectively. Inputs of the AND gate 406 are connected to the output of the inverter 300 and the third input ID2, respectively. Inputs of the AND gate 407 are connected to the output of the inverter 300 and the output of the inverter 301, respectively.

Inputs of the OR gate 500 are connected to an output of the AND gate 400 and an output of the AND gate 401, respectively. Inputs of the OR gate 501 are connected to an output of the AND gate 402 and an output of the AND gate 403, respectively. Inputs of the OR gate 502 are connected to an output of the AND gate 404 and an output of the AND gate 405, respectively. Inputs of the OR gate 503 are connected to an output of the AND gate 406 and an output of the AND gate 407, respectively. An output of the AND gate 500 is connected to the first output OD0, and an output of the AND gate 501 is connected to the second output OD1. An output of the AND gate 502 is connected to the third output OD2, and an output of the AND gate 503 is connected to the fourth OD3.

Operation of Modulation Circuit

Now, an operation of the modulation circuit at a transmitter side will be described.

When the three-bit serial-to-parallel conversion circuit 200 captures the three-bit serial data "000" as the input signal 10-1 in synchronism with the input clock 11-1, the three-bit serial-to-parallel conversion circuit 200 outputs "0" from the first output Q0, and "0" from the second output Q1 and "0" from the third output Q2. In the decoder 201 receiving the outputs of the three-bit serial-to-parallel conversion circuit 200, the first output OD0 outputs "0", the second output OD1 outputs "0", the third output OD2 outputs "0", and the fourth output OD3 outputs "1".

The four-bit parallel-to-serial conversion circuit 202 captures the outputs OD0, OD1, OD2 and OD3 of the decoder 201 at the data inputs D0, D1, D2 and D3 in parallel. In synchronism with the modulation clock 12-1, the four-bit parallel-to-serial conversion circuit 202 serially outputs the fourth data input, the third data input, the second data input and the first data input in the named order as the modulation signal 13-1. Namely, the four-bit serial data "1000" is outputted as the modulation signal 13-1. This operation shows the modulation of the first word shown in FIG. 2.

Similarly, when the three-bit serial-to-parallel conversion circuit 200 captures the three-bit serial data "001" as the input signal 10-1, the first output Q0 outputs "1", the second output Q1 outputs "0", and the third output Q2 outputs "0". The first output OD0 of the decder 201 outputs "0", the second output OD1 outputs "0", the third output OD2 outputs "1", and the fourth output OD3 outputs "0". Namely, the four-bit serial data "0100" is outputted as the modulation signal 13-1. This operation shows the modulation of the second word shown in FIG. 2.

When the three-bit serial-to-parallel conversion circuit 200 captures the three-bit serial data "001" as the input signal 10-1, the first output Q0 outputs "0", the second output Q1 outputs "1", and the third output Q2 outputs "0". The first output OD0 of the decoder 201 outputs "0", the second output OD1 outputs "1", the third output OD2 outputs "0", and the fourth output OD3 outputs "0". Namely, the four-bit serial data "0010" is outputted as the modulation signal 13-1. This operation shows the modulation of the third word shown in FIG. 2.

When the three-bit serial-to-parallel conversion circuit 200 captures the three-bit serial data "011" as the input signal 10-1, the first output Q0 outputs "1", the second output Q1 outputs "1", and the third output Q2 outputs "0". The first output OD0 of the decoder 201 outputs "1", the second output OD1 outputs "0", the third output OD2 outputs "0" and the fourth output OD3 outputs "0". Namely, the four-bit serial data "1001" is outputted as the modulation signal 13-1. This operation shows the modulation of the fourth word shown in FIG. 2.

When the three-bit serial-to-parallel conversion circuit 200 captures the three-bit serial data "100" as the input signal 10-1, the first output Q0 outputs "0", the second output Q1 outputs "0", and the third output Q2 outputs "1". The first output OD0 of the decoder 201 outputs "1", the second output OD1 outputs "0", the third output OD2 outputs "0", and the fourth output OD3 outputs "1". Namely, the four-bit serial data "1001" is outputted as the modulation signal 13-1. This operation shows the modulation of the fifth word shown in FIG. 2.

When the three-bit serial-to-parallel conversion circuit 200 captures the three-bit serial data "101" as the input signal 10-1, the first output Q0 outputs "1", the second output Q1 outputs "0", and the third output Q2 outputs "1". The first output OD0 of the decoder 201 outputs "0", the second output OD1 outputs "1", the third output OD2 outputs "1", and the fourth output OD3 outputs "0". Namely, the four-bit serial data "0110" is outputted as the modulation signal 13-1. This operation shows the modulation of the sixth word shown in FIG. 2.

When the three-bit serial-to-parallel conversion circuit 200 captures the three-bit serial data "110" as the input signal 10-1, the first output Q0 outputs "0", the second output Q1 outputs "1", and the third output Q2 outputs "1". The first output OD0 of the decoder 201 outputs "0", the second output OD1 outputs "1", the third output OD2 outputs "0" and the fourth output OD3 outputs "1". Namely, the four-bit serial data "1010" is outputted as the modulation signal 13-1. This operation shows the modulation of the seventh word shown in FIG. 2.

When the three-bit serial-to-parallel conversion circuit 200 captures the three-bit serial data "111" as the input signal 10-1, the first oi input Q0 outputs "1", the second output Q1 outputs "1", and the third output Q2 outputs "1". The first output OD0 of the decoder 201 outputs "1", the second output OD1 outputs "0", the third output OD2 outputs "1", and the fourth output OD3 outputs "0". Namely, the four-bit serial data "0101" is outputted as the modulation signal 13-1. This operation shows the modulation of the eighth word shown in FIG. 2.

Demodulation Circuit

Figure 7:
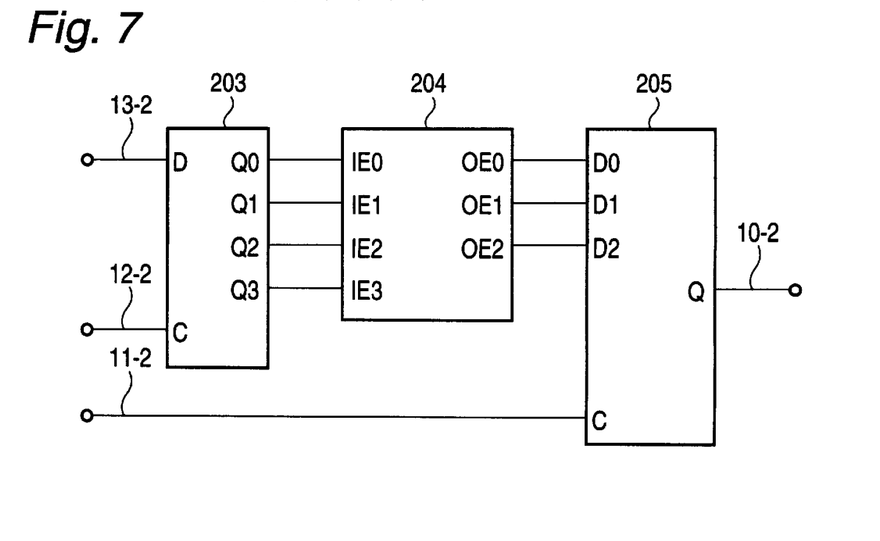
FIG. 7 is a circuit diagram illustrating one example of a demodulation circuit at a receiver side in the one embodiment of the modulation/demodulation system in accordance with the present invention.

Referring to FIG. 7, there is shown a circuit diagram illustrating one example of a demodulation circuit at a receiver side in the one embodiment of the modulation/demodulation system in accordance with the present invention.

In FIG. 7, Reference Numeral 203 designates a four-bit serial-to-parallel conversion circuit, and Reference Numeral 204 denotes a encoder. Reference Numeral 205 indicates a three-bit parallel-to-serial conversion circuit. Reference Numeral 13-2 shows a modulation signal supplied to a data input D of the four-bit serial-to-parallel conversion circuit 203, and Reference Numeral 12-2 designates a modulation clock supplied to a clock input C of the four-bit serial-to-parallel conversion circuit 203. Reference Numeral 11-2 denotes an input clock supplied to a clock input C of the three-bit parallel-to-serial conversion circuit 205, and Reference Numeral 10-2 indicates an output signal outputted from a data output Q of the three-bit parallel-to-serial conversion circuit 205.

First, second, third and fourth inputs IE0, IE1, IE2 and IE3 of the encoder 204 are connected to first, second, third and fourth data outputs Q0, Q1, Q2 and Q3 of the four-bit serial-to-parallel conversion circuit 203, respectively, and first, second and third outputs OE0, OE1 and OE2 of the encoder 204 are connected to first, second and third data inputs D0, D1 and D2 of the three-bit parallel-to-serial conversion circuit 205, respectively.

Figure 8:
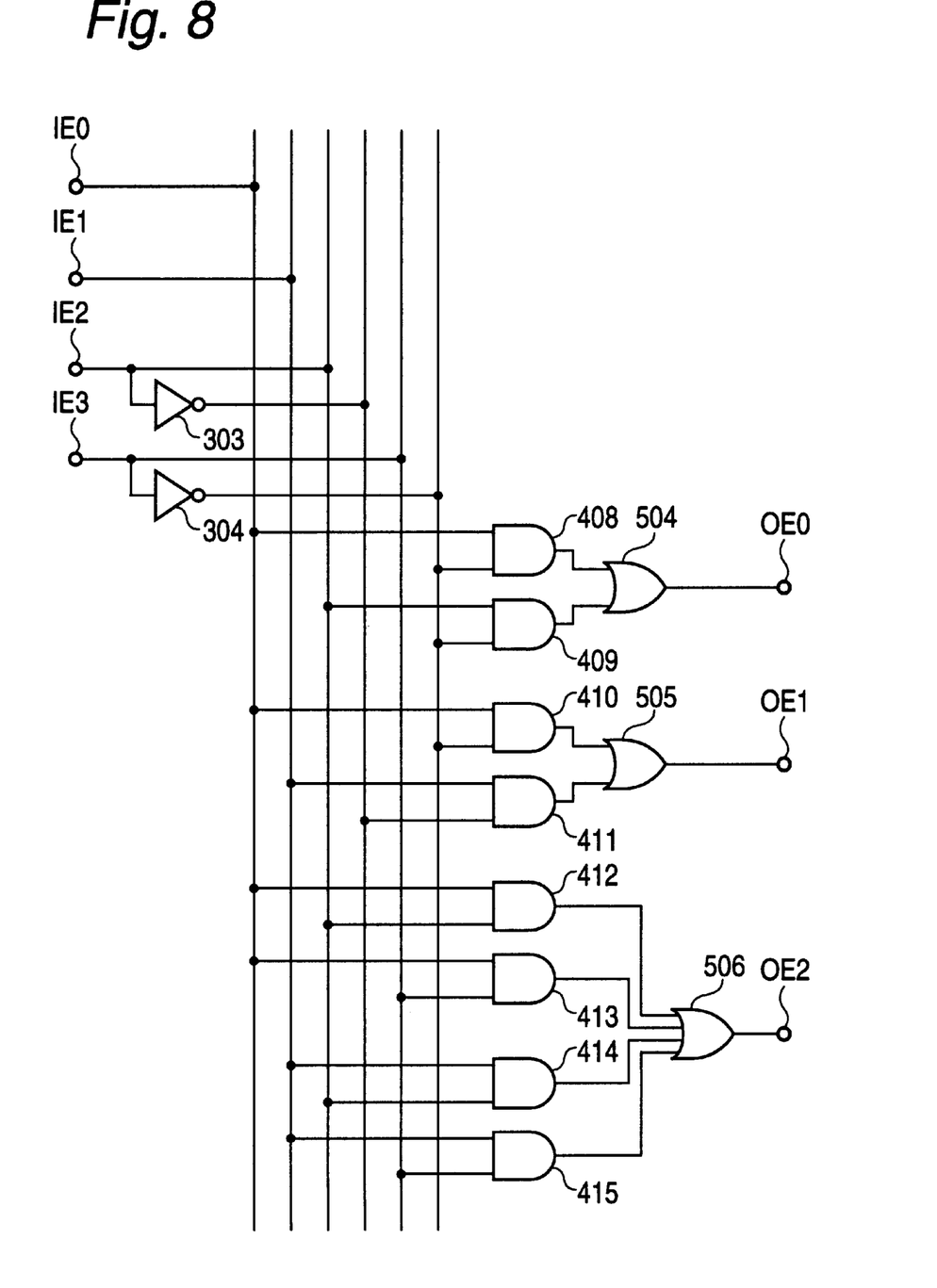
FIG. 8 is a circuit diagram illustrating one example of the encoder included in the modulation circuit shown in FIG. 7.

FIG. 8 is a circuit diagram illustrating one example of the encoder 204 included in the modulation circuit shown in FIG. 7. The encoder 204 includes the first input IE0, the second input IE1, the third input E2, the third input IE3, the first output OE0, the second output OE1, the third output OE2, inverters 303 and 304, AND gates 408, 409, 410, 411, 412, 413, 414 and 415, and OR gates 504, 505 and 506, which are connected as shown.

An input of the inverter 303 is connected to the third input IE2, and an input of the inverter 304 is connected to the fourth input IE3. Inputs of the AND gate 408 are connected to the first input EE0 and an output of the inverter 304, respectively. Inputs of the AND gate 409 are connected to the third input IE2 and the output of the inverter 304, respectively. Inputs of the AND gate 410 are connected to the first input IEO and the output of the inverter 304, respectively. Inputs of the AND gate 411 are connected to the second input IE1 and the output of the inverter 303, respectively. Inputs of the AND gate 412 are connected to the first input IEO and the third input IE2, respectively. Inputs of the AND gate 413 are connected to the first input IEO and the fourth input IE3, respectively. Inputs of the AND gate 414 are connected to the second input IE1 and the third input IE2, respectively. Inputs of the AND gate 415 are connected to the second input IE1 and the fourth input IE3, respectively.

Inputs of the OR gate 504 are connected to an output of the AND gate 408 and an output of the AND gate 409, respectively. Inputs of the OR gate 505 are connected to an output of the AND gate 410 and an output of the AND gate 411, respectively. Inputs of the OR gate 506 are connected to an output of the AND gate 412, an output of the AND gate 413, an output of the AND gate 414 and an output of the AND gate 415, respectively. An output of the AND gate 504 is connected to the first output OE0, and an output of the AND gate 505 is connected to the second output OE1. An output of the AND gate 506 is connected to the third output OE2.

Operation of Demodulation Circuit

Now, an operation of the demodulation circuit at a receiver side will be described.

When the four-bit serial-to-parallel conversion circuit 203 captures the four-bit serial data "1000" as the modulation signal 13-2 in synchronism with the modulation clock 12-2, the four-bit serial-to-parallel conversion circuit 203 outputs "0", "0", "0"and "1" from the first output Q0, the second output Q1, the third output Q2 and the fourth output Q3, respectively. In the encoder 204 receiving the outputs of the four-bit serial-to-parallel conversion circuit 203, the first out ut OE0 outputs "0", the second output OE1 outputs "0" and the third output OE2 outputs "0". The three-bit parallel-to-serial conversion circuit 205 receives the output OE0, OE1 and OE2 of the encoder 204 in parallel, and serially outputs the third data input, the second data input and the first data input in the named order in synchronism with the input clock 11-2. In other words, the three-bit serial data "000" is outputted as the output signal 10-2. This operation shows the demodulation of the fist word shown in FIG. 2.

Similarly, when the four-bit serial-to-parallel conversion circuit 203 captures the four-bit serial data "0100" as the modulation Signal 13-2, the four-bit serial-to-parallel conversion circuit 203 outputs "0", "0", "1" and "0" from the first output Q0, the second output Q1, the third output Q2 and the fourth output Q3, respectively. The encoder 204 outputs "1", "1", and "0" from the first output OE0, the second output OE1 and the third output OE2, respectively. In other words, the three-bit serial data "001" is outputted as the output signal 10-2. This operation shows the demodulation of the second word shown in FIG. 2.

When the four-bit serial-to-parallel conversion circuit 203 captures the four-bit serial data "0010" as the modulation signal 13-2, the four-bit serial-to-parallel conversion circuit 203 outputs "0", "1", "0" and "0" from the first output Q0, the second output Q1, the third output Q2 and the fourth output Q3, respectively. The encoder 204 outputs "0", "1", and "0" from the first output OE0, the second output OE1 and the third output OE2, respectively. In other words, the three-bit serial data "010" is outputted as the output signal 10-2. This operation shows the demodulation of the third word shown in FIG. 2.

When the four-bit serial-to-parallel conversion circuit 203 captures the four-bit serial data "0001" as the modulation signal 13-2, the four-bit serial-to-parallel conversion circuit 203 outputs "1", "0", "0" and "0" from the first output Q0, the second output Q1, the third output Q2 and the fourth output Q3, respectively. The encoder 204 outputs "1", "1", and "0" from the first output OE0, the second output OE1 and the third output OE2, respectively. In other words, the three-bit serial data "011" is outputted as the output signal 10-2. This operation shows the demodulation of the fourth word shown in FIG. 2.

When the four-bit serial-to-parallel conversion circuit 203 captures the four-bit serial data "1001" as the modulation signal 13-2, the four-bit serial-to-parallel conversion circuit 203 outputs "1", "0", "0" and "1" from the first output Q0, the second output Q1, the third output Q2 and the fourth output Q3, respectively. The encoder 204 outputs "0", "0", and "1" from the first output OE0, the second output OE1 and the third output OE2, respectively. In other words, the three-bit serial data "100" is outputted as the output signal 10-2. This operation shows the demodulation of the fifth word shown in FIG. 2.

When the four-bit serial-to-parallel conversion circuit 203 captures the four-bit serial data "0110" as the modulation signal 13-2, the four-bit serial-to-parallel conversion circuit 203 outputs "0", "1", "1" and "0" from the first output Q0, the second output Q1, the third output Q2 and the fourth output Q3, respectively. The encoder 204 outputs "1", "0", and "1" from the first output OE0, the second output OE1 and the third output OE2, respectively. In other words, the three-bit serial data "101" is outputted as the output signal 10-2. This operation shows the demodulation of the sixth word shown in FIG. 2.

When the four-bit serial-to-parallel conversion circuit 203 captures the four-bit serial data "1010" as the modulation signal 13-2, the four-bit serial-to-parallel conversion circuit 203 outputs "0", "1", "0" and "1" from the first output Q0, the second output Q1, the third output Q2 and the fourth output Q3, respectively. The encoder 204 outputs "0", "1", and "1" from the first output OE0, the second output OE1 and the third output OE2, respectively. In other words, the three-bit serial data "110" is outputted as the output signal 10-2. This operation shows the demodulation of the seventh word shown in FIG. 2.

When the four-bit serial-to-parallel conversion circuit 203 captures the four-bit serial data "0101" as the modulation signal 13-2, the four-bit serial-to-parallel conversion circuit 203 outputs "1", "0", "1" and "0" from the first output Q0, the second output Q1, the third output Q2 and the fourth output Q3, respectively. The encoder 204 outputs "1", "1", and "1" from the first output OE0, the second output OE1 and the third output OE2, respectively. In other words, the three-bit serial data "111 " is outputted as the output signal 10-2. This operation shows the demodulation of the eighth word shown in FIG. 2.

As mentioned above, according to the present invention, data is transferred by modulating "n" bits (for example, three bits) of the input signal to "n+1" bits (for example, four bits). Therefore, the frequency of the input clock can be made to be ¾ of the frequency of the modulation clock, with the result that the data transfer rate can be elevated.

For example, in the case of the modulation clock frequency of 8 MHz, the input clock frequency becomes 6 MHz, and therefore, the data transfer rate becomes 6 Mbps. In other words, under the same modulation clock frequency, the data transfer rate can be made to be one and half times of the prior art 4PPM system.

Furthermore, according to the present invention, in the modulation signal, the total width of the continuing pulses is two bits at maximum, and the total width of the continuing bits having no pulse is six bits at maximum. This is the same as the prior art 4PPM system. Therefore, when the infrared communication is performed in accordance with the modulation/demodulation system of the present invention, it is possible to use an infrared light emitting diode having the same response characteristics as that of the infrared light emitting diode used in the prior art 4PPM system.

The invention has thus been shown and described with reference to the specific embodiments. However, it should be noted that the present invention is in no way limited to the details of the illustrated structures but changes and modifications may be made within the scope of the appended claims.

What is claimed is:

1. A modulation/demodulation method so configured that at a transmitter side, data is transmitted after an input signal is converted into a modulation signal train comprising serially arranged words each comprising bits of a predetermined number larger than a bit number of the input signal, and a position of a pulse existing in the word is different from one pattern of the input signal to another, wherein, at the transmitter side, the input signal is divided into signal strings each comprising "n" bits, where "n" is a positive integer larger than "1", and each signal string comprising "n" bits is converted into a modulation signal string of one word comprising "n+1" bits, and then, the modulation signal string is serially transmitted bit by bit, and wherein, at a receiver side, the signal serially received bit by bit is divided into received signal strings each comprising "n+1" bits, and each of the received signal strings is demodulated into a demodulated signal string comprising "n" bits, so that the demodulated signal string is serially outputted bit by bit.

2. A modulation/demodulation method claimed in claim 1 wherein "n" is 3 and "n+1" is 4, and said modulation signal string includes eight different patterns of "1000", "0100", "0010", "0001", "1001", "0110", "1010" and "0101".

3. A modulation/demodulation apparatus so configured that at a transmitter side, data is transmitted after an input signal is converted into a modulation signal train comprising serially arranged words each comprising bits of a predetermined number larger than a bit number of the input signal, and a position of a pulse existing in the word is different from one pattern of the input signal to another, wherein the transmitter side includes:
first converting means for converting the input signal into signal strings each comprising "n" bits, where "n" is a positive integer larger than "1";
modulating means for modulating each signal string comprising "n" bits into a modulation signal string of one word comprising "n+1" bits; and
first output means for serially outputting the modulation signal string bit by bit.

4. A modulation/demodulation apparatus claimed in claim 3 wherein a receiver side includes:
second converting means for converting the signal serially outputted bit by bit from the first output means of the transmitter side, into received signal strings each comprising "n+1" bits;
demodulating means for demodulating each received signal string into a demodulated signal string comprising "n" bits; and
second output means for serially outputting bit by bit the demodulated signal string comprising "n" bits.

5. A modulation/demodulation apparatus claimed in claim 3 wherein said modulating means converts a binary signal string of the "n" bits having a $2^n$ different combinations, into the modulation signal string of one word comprising the "n+1" bits having $2^n$ different combination patterns corresponding to the $2^n$ different combinations in a one-to-one relation in each of the $2^n$ different modulation signal strings, regardless of how the modulation signal strings are serially arranged, the signal value of "1" continues only two signals at maximum, and the signal value of "0" continues only six signals at maximum.

6. A modulation/demodulation apparatus claimed in claim 3 wherein "n" is 3 and "n+1" is 4, and said modulation signal string includes eight different patterns of "1000", "0100", "0010", "0001", "10001", "0110", "1010" and "0101".

7. A modulation/demodulation apparatus claimed in claim 4 wherein "n" is 3 and "n+1" is 4, and said modulation signal string includes eight different patterns of "1000", "0100", "0010", "0001", "1001", "0110", "1010" and "0101".

8. A modulation/demodulation apparatus claimed in claim 5 wherein "n" is 3 and "n+1" is 4, and said modulation signal string includes eight different patterns of "1000", "0100", "0010", "0001", "1001", "0110", "1010" and "0101".

9. A modulation/demodulation method comprising:

at a transmitter side, dividing an input signal is divided into signal strings each comprising "n" bits, where "n" is a positive integer larger than "1";

converting each signal string comprising "n" bits into a modulation signal string of one word comprising "n+1" bits; and serially transmitting the modulation signal string bit by bit, wherein at a receiver side, the signal serially received bit by bit is divided into received signal strings each comprising "n+1" bits.

10. The modulation/demodulation method claimed in claim 9, wherein "n" is 3 and "n+1" is 4, and said modulation signal string includes eight different patterns of "1000", "0100", "0010", "0001", "10001", "0110", "1010" and "0101".

11. A modulation/demodulation apparatus comprising:

a transmitter side; and a receiver side, wherein said transmitter side comprises:

a divider for dividing an input signal into signal strings each comprising "n" bits, where "n" is a positive integer larger than "1";

a converter for converting each signal string comprising "n" bits into a modulation signal string of one word comprising "n+1" bits; and an output device for serially transmitting the modulation signal string bit by bit to said receiver side, wherein, at said receiver side, the signal serially received bit by bit is divided into received signal strings each comprising "n+1" bits.

12. The modulation/demodulation apparatus claimed in claim 11, wherein the receiver side includes:

a second converter for converting the signal serially outputted bit by bit from the output device of the transmitter side, into received signal strings each comprising "n+1" bits.

13. The modulation/demodulation apparatus claimed in claim 12, wherein the receiver side further includes:

a demodulator for demodulating each received signal string into a demodulated signal string comprising "n" bits.

14. The modulation/demodulation apparatus claimed in claim 13, wherein the receiver side further includes:

a second output device for serially outputting bit by bit the demodulated signal string comprising "n" bits.

15. The modulation/demodulation apparatus claimed in claim 11, wherein said converter converts a binary signal string of the "n" bits having a $2^n$ different combinations, into the modulation signal string of one word comprising the "n+1" bits having $2^n$ different combination patterns corresponding to the $2^n$ different combinations in a one-to-one relation in each of the $2^n$ different modulation signal strings, regardless of how the modulation signal strings are serially arranged, the signal value of "1" continues only two signals at maximum, and the signal value of "0" continues only six signals at maximum.

16. The modulation/demodulation apparatus claimed in claim 11, wherein "n" is 3 and "n+1" is 4, and said modulation signal string includes eight different patterns of "1000", "0100", "0010", "0001", "1001", "0110", "1010" and "0101".

17. The modulation/demodulation apparatus claimed in claim 14, wherein "n" is 3 and "n+1" is 4, and said modulation signal string includes eight different patterns of "1000", "0100", "0010", "0001", "1001", "0110", "1010" and "0101".

18. The modulation/demodulation apparatus claimed in claim 15, wherein "n" is 3 and "n+1" is 4, and said modulation signal string includes eight different patterns of "1000", "0100", "0010", "0001", "1001", "0110", "1010" and "0101".

* * * * *